United States Patent [19]

Tojima et al.

[11] Patent Number: 4,674,991

[45] Date of Patent: Jun. 23, 1987

[54] DAMPER DISC HAVING ANNULAR PROTRUSIONS AND RECESSES

[75] Inventors: Hiromi Tojima; Juji Kajitani, both of Hirakata, Japan

[73] Assignee: Kabushiki Kaisha Daikin Seisakusho, Osaka, Japan

[21] Appl. No.: 852,269

[22] Filed: Apr. 15, 1986

Related U.S. Application Data

[62] Division of Ser. No. 418,771, Sep. 16, 1982, Pat. No. 4,601,676.

[30] Foreign Application Priority Data

Mar. 14, 1980 [JP] Japan .................................. 55-32905
Feb. 28, 1983 [JP] Japan .................................. 55-24883

[51] Int. Cl.⁴ ........................... F16D 3/14; F16D 3/80
[52] U.S. Cl. .................................... 464/24; 192/58 B; 192/106.2; 464/64; 464/68
[58] Field of Search ................. 192/3.28, 30 V, 58 B, 192/70.17, 106.1, 106.2; 464/24, 27, 62, 64, 66, 67, 68

[56] References Cited

U.S. PATENT DOCUMENTS

| | | | |
|---|---|---|---|
| 2,316,820 | 4/1943 | Thelander | 464/68 X |
| 2,337,134 | 12/1943 | Thelander | 192/106.2 |
| 2,513,379 | 7/1950 | Thelander | 192/106.2 |
| 2,674,863 | 4/1954 | Thelander | 464/68 |
| 2,826,902 | 3/1958 | De Coursey | 464/68 |
| 4,232,534 | 11/1980 | Lamarche | 464/68 |
| 4,351,167 | 9/1982 | Hanke et al. | 464/24 |
| 4,496,034 | 1/1985 | Bopp | 192/58 B X |
| 4,503,952 | 3/1985 | Hesse | 192/58 B X |

FOREIGN PATENT DOCUMENTS 687756  6/1964  Canada .................. 192/106.2

Primary Examiner—Daniel P. Stodola
Attorney, Agent, or Firm—Armstrong, Nikaido, Marmelstein & Kobovcik

[57] ABSTRACT

The present invention discloses a damper disc comprising a spline hub; a radial flange formed at the hub; a case connected to facings; circumferentially spaced plural compressible coil springs connecting the case and the flange together; sealed spring chambers formed around the springs by the case or a cover; sealed narrow spaces connecting the spring chambers together; and spring seats disposed at both ends of the springs; said chambers and spaces being filled with oil, so that the oil applies a resistance force to the moving spring seats. At least one of side surfaces of a portion of the flange radially inside the springs may be provided with radially spaced annular protrusions, and the cases may be provided with annular protrusions engaging with the protrusions on the flange with narrow spaces therebetween.

4 Claims, 16 Drawing Figures

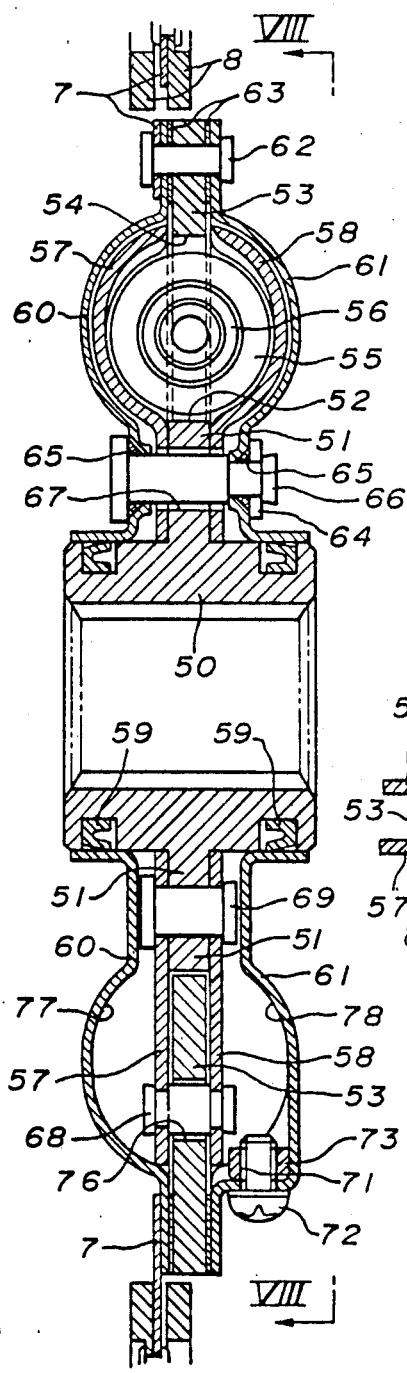
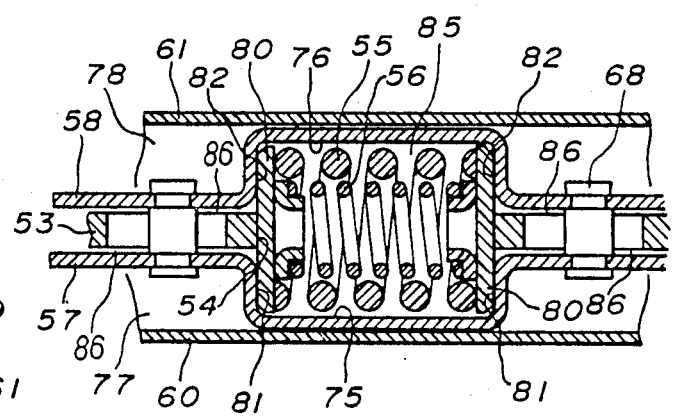
FIG. 7
FIG. 9

DAMPER DISC HAVING ANNULAR PROTRUSIONS AND RECESSES

This is a division of application Ser. No. 418,771 filed Sept. 16, 1982, now U.S. Pat. No. 4,601,676.

BACKGROUND OF THE INVENTION

The present invention relates to a damper disc in which a shock absorber of hydraulic type is arranged so as to effectively absorb a torsional vibration for improving a starting feeling of a vehicle.

Generally, a clutch disc of an automobile has been provided with a damper disc of frictional type including friction washers. However, such damper generates a fixed torque hysteresis independently of a relative torsion speed between a driving side and a driven side. Therefore, when damping characteristics are determined so as to achieve a good starting feeling, torsional vibration in high speed driving can not effectively be absorbed.

Accordingly, it is an object of the invention to provide an improved damper disc, overcoming the above-noted disadvantages, in which a shock absorber of hydraulic type is arranged.

Other and further objects, features and advantages of the invention will appear more fully from the following description of the preferred embodiments of the invention.

BRIEF DESCRIPTION OF THE DRAWINGS

FIG. 7 is a sectional view of a clutch disc of another embodiment according to the invention;

FIG. 9 is a sectional view taken along line IX—IX of FIG. 8;

DETAILED DESCRIPTION OF THE PREFERRED EMBODIMENTS

Figure 1:
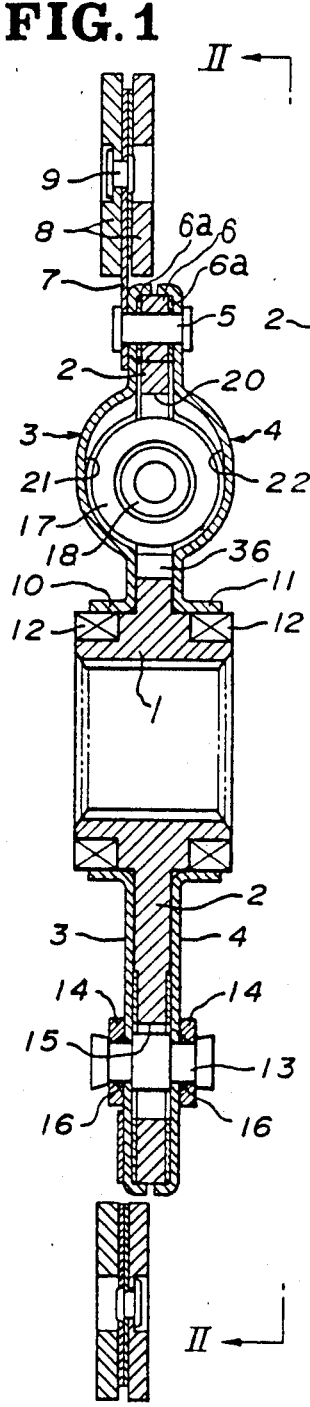
FIG. 1 is a sectional partial view of a clutch disc of an embodiment according to the invention.

Referring to FIG. 1, a spline hub 1 splined to an output shaft (not shown) has a radial flange 2. Both side surfaces of the flange 2 are fully covered by a pair of cases 3 and 4, which have a larger diameter than the flange 2. Radially outer portions of the cases 3 and 4 are connected together by circumferentially spaced rivets 5 with an annular ring 6 and an annular seal 6a therebetween. The rivets 5 fix cushioning plates 7 to the case 3. A pair of friction facings 8 are fixed to both surfaces of the cushioning plates 7 by rivets 9. The cases 3 and 4 have cylindrical flanges 10 and 11 at their inner peripheries. Annular seals 12 are disposed between the flanges 10 and 11 and the outer peripheral surface of the hub 1. Both cases 3 and 4 are connected together by stopper pins 13 which extend through recesses 15 in the flange 2. Washers 14 are fitted around each pin 13. Annular seals 16 are arranged around each pin 13 and between the washers 14 and the cases 3 and 4. Circumferentially extending compressible coil springs 17 and 18 are arranged in openings 20 in the flange 2. The springs 17 have large diameter, and the springs 18 have small diameter. A pair of the springs 17 and 18 are coaxially arranged. Side portions of the springs 17 and 18 protruding from the openings 20 are covered by hollows 21 and 22 formed in the cases 3 and 4.

Figure 2:
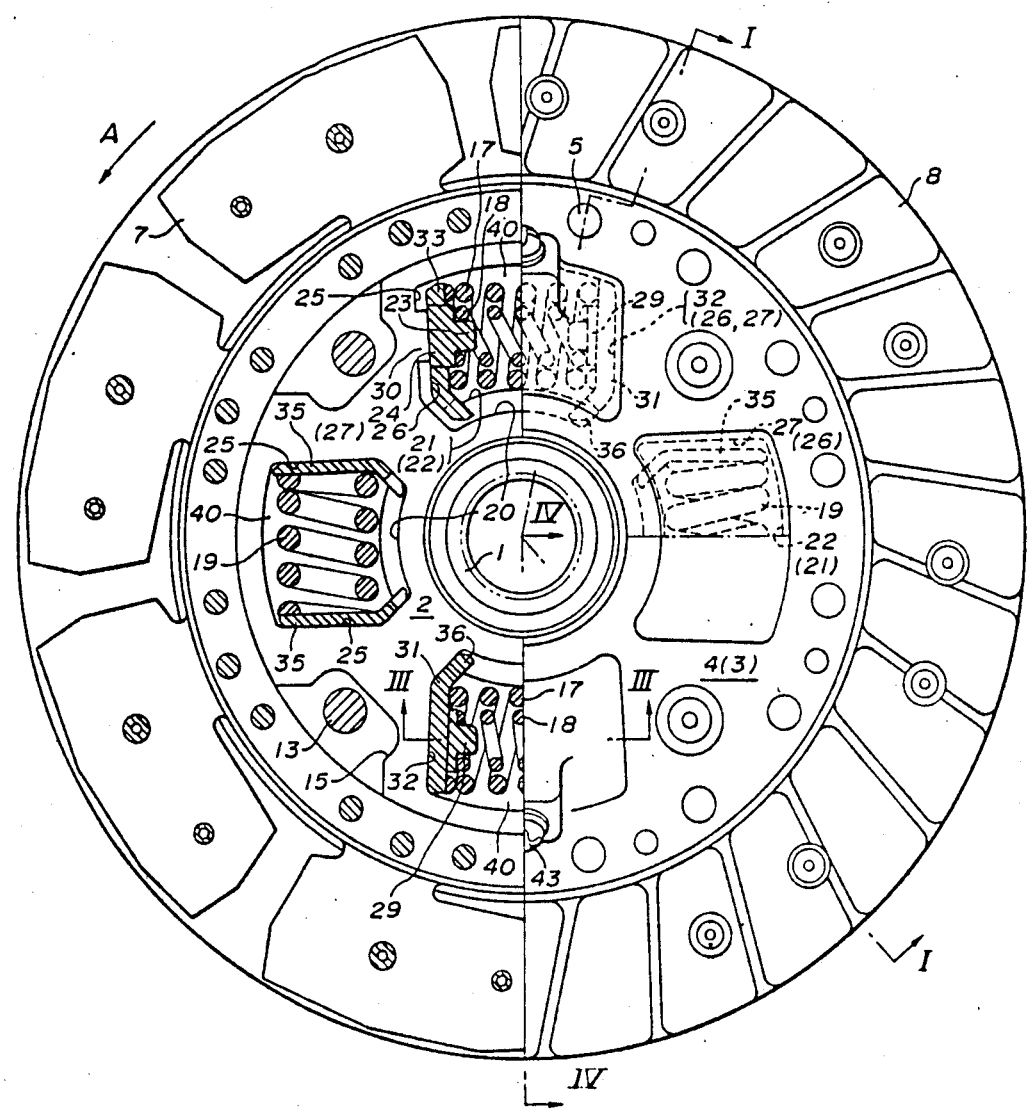
FIG. 2 is a partially cut-away elevation viewed in a direction of arrows II—II of FIG. 1.

Referring to FIG. 2, a disc is provided with two sets of the springs 17 and 18 and two compressible coil springs 19 which are alternately arranged and circumferentially equally spaced. When the cases 3 and 4 do not twist or torsionally turn with respect to the flange 2 as shown in FIG. 2, one end of each spring 18 is in contact with a small spring seat 24 having an integral guide pin 23. Each seat 24 contacts only projection 30 and the inner circumference of spring seat 33. The other end of each spring 18 is in contact with a spring seat 29 having an integral guide pin. Each seat 29 is supported through a spring seat 31 by a side edge 32 of the opening 20 and the inner end surfaces 26 and 27 of the hollows 21 and 22 as shown in upper right portion in FIG. 2. With respect to a disc rotating direction A, the seats 24 are positioned in front of the springs and the seats 29 are positioned in back. An end of each spring 17 is in contact with the radially outer portion of the spring seat 31. The other end of each spring 17 is supported through an annular spring seat 33 by the inner end surfaces 26 and 27 of the hollows 21 and 22. The spring seats 33 are slidably fitted around the seat 24. A circumferential space corresponding to a torsion angle of 3° is spaced between each seat 33 and hollow portions of each side edge 25 which are radially inside and outside portions to the projection 30. Both ends of each spring 19 are supported through spring seats 35 by the side edges 25 of the opening 20 as shown in left portion in FIG. 2. Spaces corresponding to a torsion angle of 6° are formed between the spring seats 35 and the inner end surfaces 26 and 27 of the hollows 21 and 22. The spring seat 31, 33 and 35 have similar outer peripheral shape, and are slidably and closely fitted to inner surfaces of the hollows 26 and 27 and radially outer and inner edges of the openings 20. The seats 31, 33 and 35 have portions 36 projecting radially inwardly.

Figure 3:
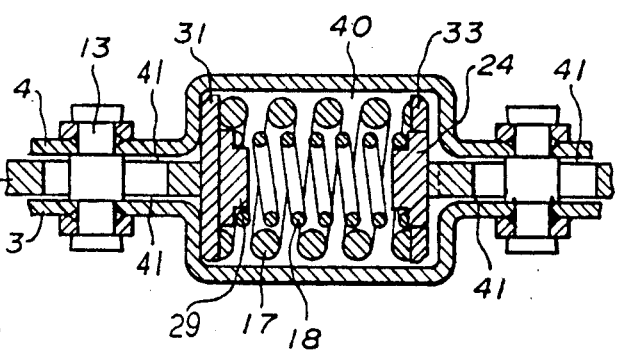
FIG. 3 is a sectional view taken along line III—III of FIG. 2.
Figure 4:
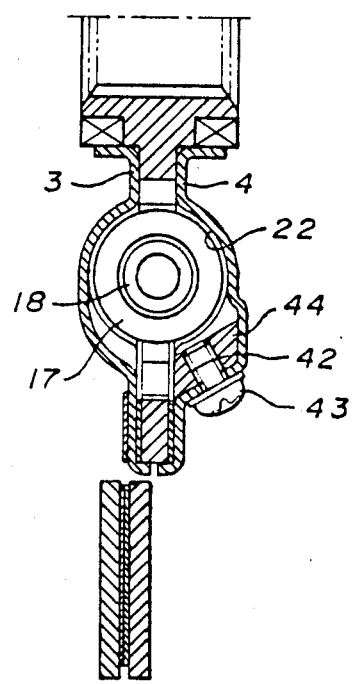
FIG. 4 is a sectional view taken along line IV—IV of FIG. 2.

Referring to FIG. 3, spring chambers 40 in which the springs are arranged and spaces 41 between the cases 3 and 4 and the flange 2 are filled with operating oil. As shown in FIG. 4, an inlet port 42 (a drain port) is formed in the hollow 22 and is closed by screw 43 (a plug) which is screwed into a nut 44 welded to the case 4.

Figure 5:
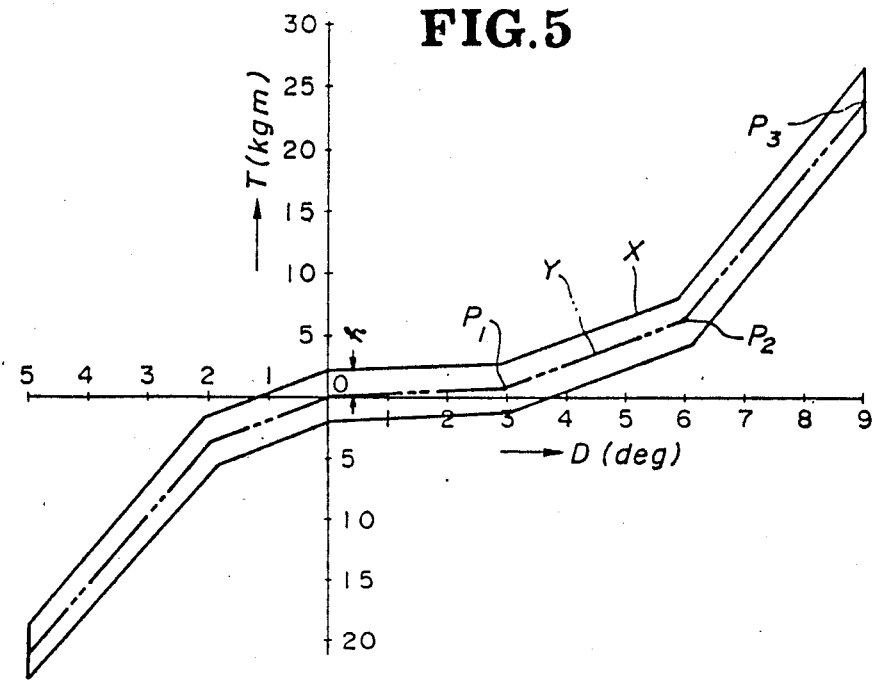
FIG. 5 is a graph of torque characteristics.

One of the specific functions or operations of the disc can be as follows. When the clutch is engaged, a torque in a rotating direction A is transmitted from a flywheel to the facings 8. The torque is then transmitted to the cases 3 and 4 and further transmitted through the springs 17, 18 and 19 to the flange 2, hub 1 and the output shaft. In this operation, the springs 17, 18 and 19 are compressed, so that the cases 3 and 4 are torsionally turned in the direction A with respect to the flange 2. While the torsion angle D is smaller than 3° (O-P1 in FIG. 5), only the small spring 18 among the springs 17, 18 and 19 transmit the torque and are compressed, thus, as shown at alternate long and two short dashes Y in FIG. 5, an increasing rate of spring-transmitted-torque, which is transmitted only through the springs, is kept small with respect to increase of the torsion angle D. When the torsion angle D reaches 3°, the annular spring seats 33 contact with the side edges 25 of the openings 20. Thus, until the torsion angle D reaches 6°, the torque T is transmitted through the springs 17 and 18, and the increasing rate of the spring-transmitted torque with respect to the torsion angle D is kept large as shown at section P1-P2 in FIG. 5. When the torsion angle D reaches 6°, the spring seats 35 contact with the inner end surfaces 26 and 27 of the hollows 21 and 22, so that the torque T is transmitted through all of the springs 17, 18 and 19, thereafter. Thus, the increasing rate of the spring-transmitted-torque with respect to the torsion angle D is kept further larger, as shown at section P2-P3 in FIG. 5. When the torsion angle D reach 9°, the stopper pins 13 contact with the edges of the recesses 15, so that further torsion is prevented.

Figure 6:
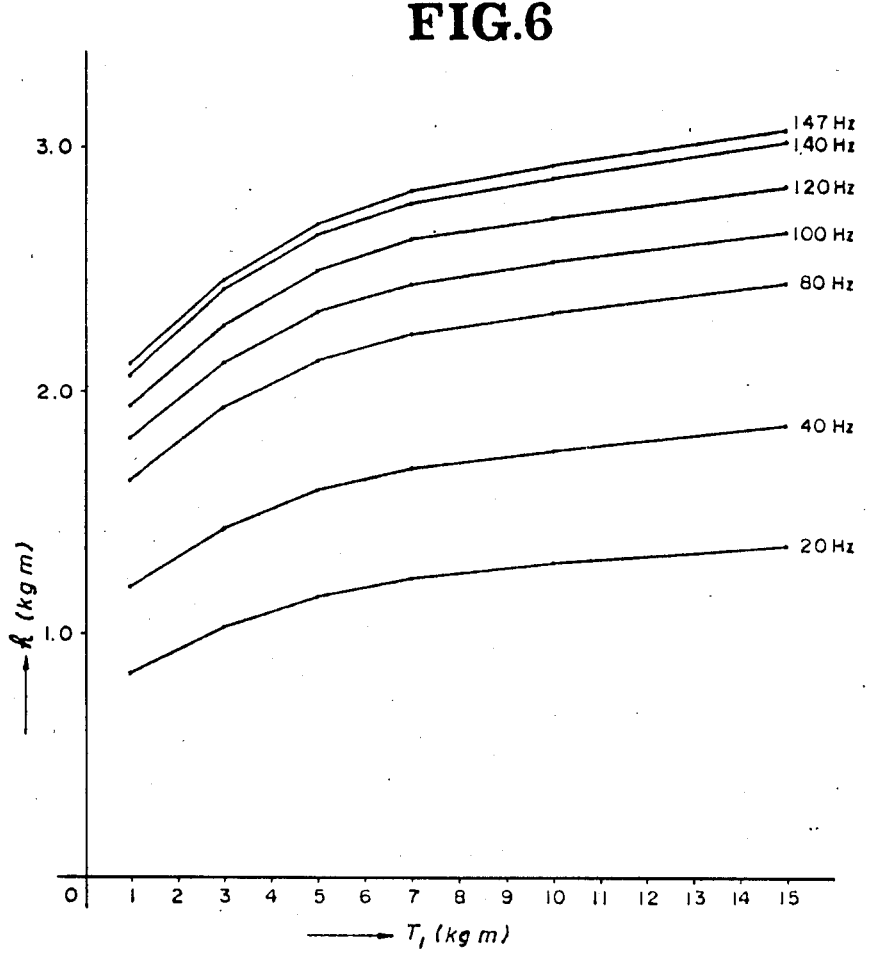
FIG. 6 is a graph explaining relations between transmitted torque and hysteresis torque at various torque frequencies.

In the above operation, the spring seats 29, 31 and 33 move rightward in FIG. 3 and function as pistons which push and discharge the oil in the chambers 40 into the spaces 41. The oil, which is being discharged toward the spaces 41, flows through narrow spaces between the outer peipheries of the spring seats 31 and 33 and the hollows 21 and 22 in FIG. 1, which applies a resistance force against the spring seats 31 and 33. The oil also applies the resistance force against the spring seat 35 in FIG. 2. The resistance force applied to the spring seats 31, 33 and 35 is transmitted to the twisting cases 3 and 4, so that a hysteresis h is added to the characteristic Y, which forms an actual torque characteristic X. The illustrated characteristic X is acquired when the torsional angular speed or turning speed is fixed. When the torsional angular speed changes and the relative moving speed of the seats 31, 33 and 35 changes, a flowing speed of the oil also changes, so that the resistance caused by the oil changes. Thus, the hysteresis h changes in accordance with the change of the torsional angular speed. FIG. 6 illustrates relations between the hysteresis h and the torques T1 of which frequencies are 20, 40, . . . 140 and 147 Hz, respectively. As apparent from FIG. 6, the hysteresis h changes when the torque T1 and the frequency which corresponds to the torsional angular speed changes.

In the embodiment detailed hereinbefore, the characteristic X including the hysteresis h is acquired also in a negative area. The members including the springs 17, 18 and 19 as well as the recesses 15 and others are so constructed that the increasing rate of the torque T changes at two steps and that a maximum torsion angle D is 5° in the negative area.

According to the invention, as stated hereinbefore, the disc includes the shock absorber of the hydraulic type, in which the hysteresis torque changes in accordance with the change of the torsional angular speed. Therefore, torque vibrations both in high speed driving and the starting and stopping operation can effectively be absorbed. The oil can easily be exchanged for oil having other viscosity so as to change the hysteresis characteristic for constructing the damper discs respectively suitable for various uses.

Following modifications may be employed.

Figure 8:
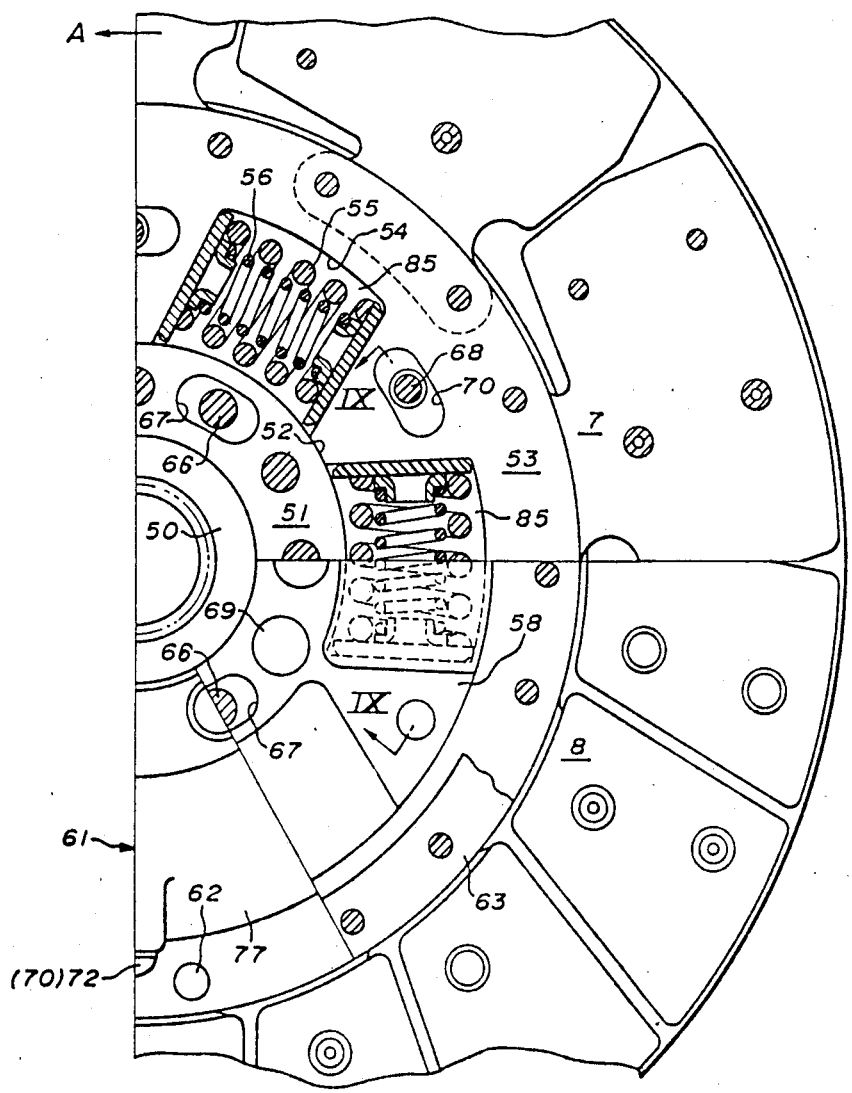
FIG. 8 is a partially cut-away partial elevation viewed in a direction of arrows VIII—VIII of FIG. 7.

Referring to FIGS. 7 and 8, a flange 51 of a spline hub 50 has a small diameter. An annular member 53 having substantially same thickness s the flange 51 is rotatably fitted to a peripheral surface 52 of the flange 51. The member 53 is provided with recesses 54 opened radially inwardly, in whch circumferentially extending compressible coil springs 55 and 56 are coaxially arranged, respectively. Both sides of the springs 55 and the flange 51 are covered by a pair of covers 57 and 58. The covers 57 and 58 and a radially outer portion of the member 53 are covered by a pair of cases 60 and 61. Annular seals 59 (FIG. 7) are disposed between the hub 50 and the cases 60 and 61. The cases 60 and 61 and the member 53 are fixed together by pins 62 with annular packings 63 therebetween. The pins 62 also fix cushioning plates 7 to the case 60. Pins 66 connecting the cases 60 and 61 together are inserted into long apertures 67 in the flange 51 and the coveres 57 and 58, respectively. A washer 64 and a seal 65 are arranged around each pin 66. As shown in FIG. 8, circumferential spaces are formed between each pin 66 and the inner edge of the aperture 67. These spaces are angularly longer than maximum torsion angles of 7° (FIG. 10) in a rotation direction A and 5° in the reverse direction. As shown in FIG. 7, both coveres 57 and 58 are fixed to the flange 51 by pins 69. Both covers 57 and 58 are also connected together by pins 68, which extend through long apertures 70 in the flange 51. Circumferential spaces are formed between each pin 68 and the inner edge of the aperture 70. These spaces correspond to the maximum torsion angles of 7° and 5°. An oil inlet 71 is formed by a nut 73 welded to the inner surface of the case 61, and is closed by a plug screw 72. An interior in the cases 60 and 61 is filled with oil supplied through the inlet 71.

As shown in FIG. 8, the disc is provided with six sets of the springs 55 and 56. The spring sets have same structures. Referring to FIG. 9, the springs 55 and 56 are covered by hollows 75 and 76 formed in the cases 57 and 58. The hollows 75 and 76 are covered by annularly extending hollows 77 and 78 formed in the cases 60 and 61. The springs 55 and 56 are contact with spring seats 80 supported by side edges of the recesses 54 in the member 53 and inner end surfaces 81 and 82 of the hollows 75 and 76.

Figure 10:
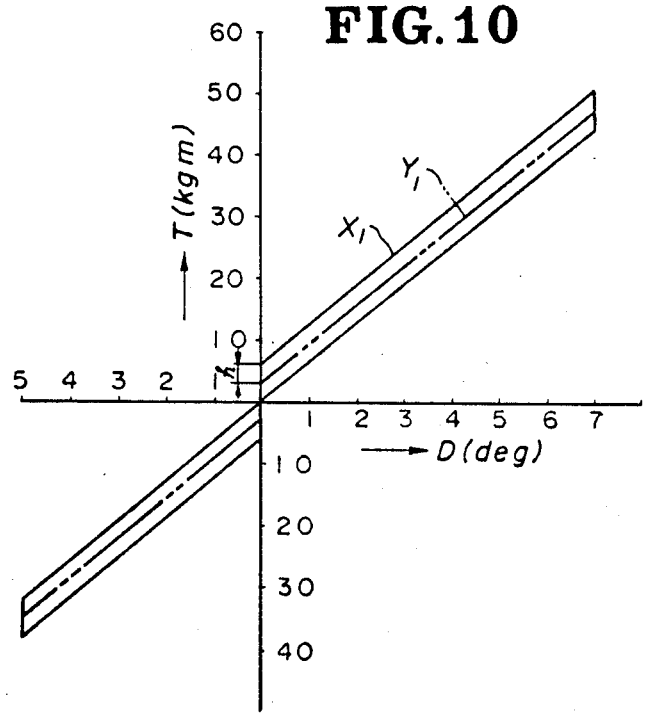
FIG. 10 is a graph of transmitted torque characteristics.

In this modification, whole of the springs 55 and 56 function without changing an incline shown in FIG. 10. A torque supplied from a flywheel to the cases 60 and 61 is transmitted to an output shaft through pins 62, the annular member 53, the springs 55 and 56, the covers 57 and 58, the pins 69, the flange 51 and the hub 50. When the torque is transmitted, the springs 55 and 56 are compressed, and the cases 60 and 61 as well as the annular member 53 torsionally turn with respect to the cover 57 and 58 as well as the flange 51. The compression of the springs 55 and 56 cause the spring seats 80 (FIG. 9) to push and discharge the oil in spring chambers 85 into spaces 86 between the covers 57 and 58 and the member 53, which causes a resistance, so that a resistance force is loaded to the spring seats 80, and a hysteresis h is acquired in a characteristic X1, as shown in FIG. 10. The hysteresis h changes in accordance with torsional angular speed. Therefore, torque vibrations in both of starting operation and high speed driving can effectively be absorbed. According to this modification, since the oil inlet 71 can be arranged at a portion of the case 61 between two sets of the springs 55 and 56, a sufficient space can be obtained for disposing the nut 73 in FIG. 7. Therefore, the nut 73 can easily be welded.

The embodiment in FIG. 7 may employ torsion springs which operate at two or more steps. The embodiment in FIG. 1 may employ torsion springs which operate at two or single step throughout the operation.

Figure 11:
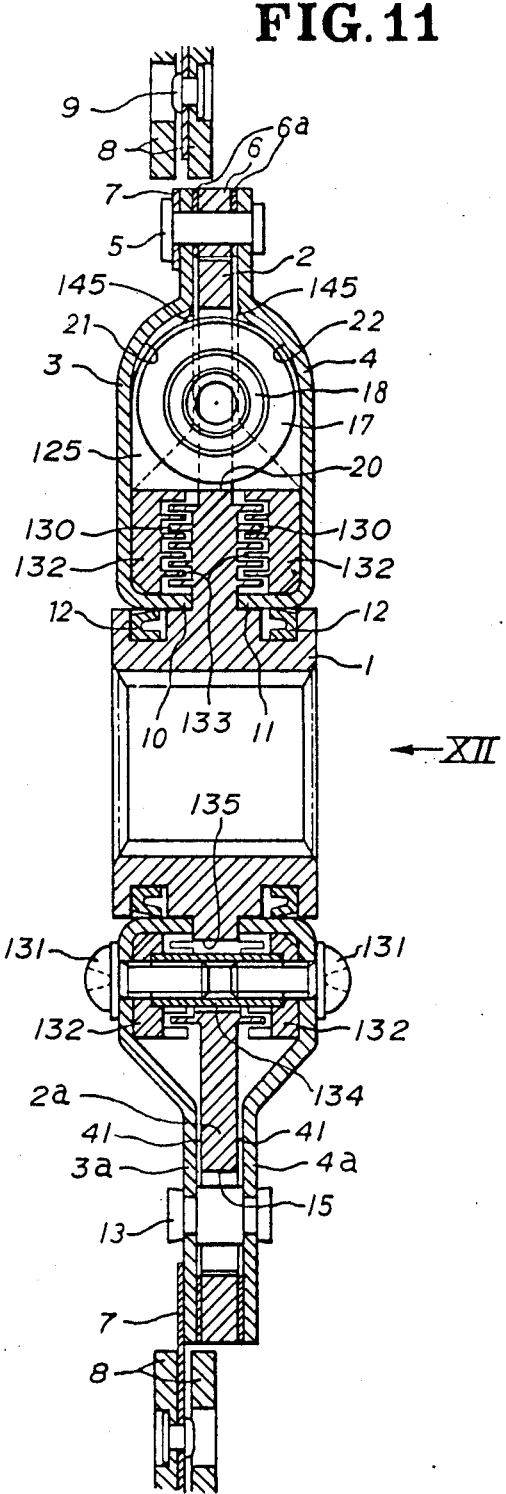
FIG. 11 is a sectional partial view of a clutch disc of another embodiment according to the invention.
Figure 12:
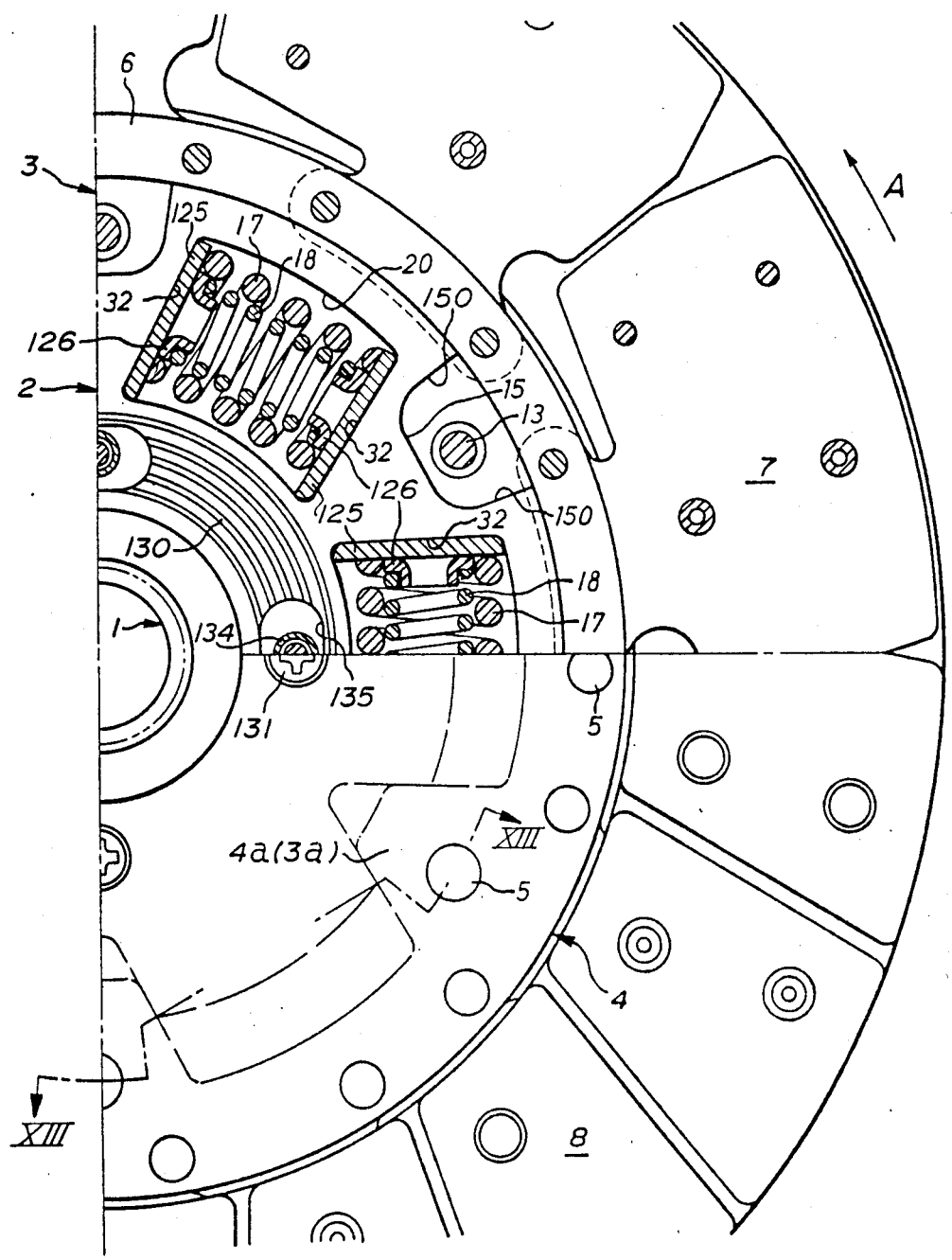
FIG. 12 is a partially cut-away partial view viewed in a direction of an arrow XII of FIG. 11.
Figure 13:
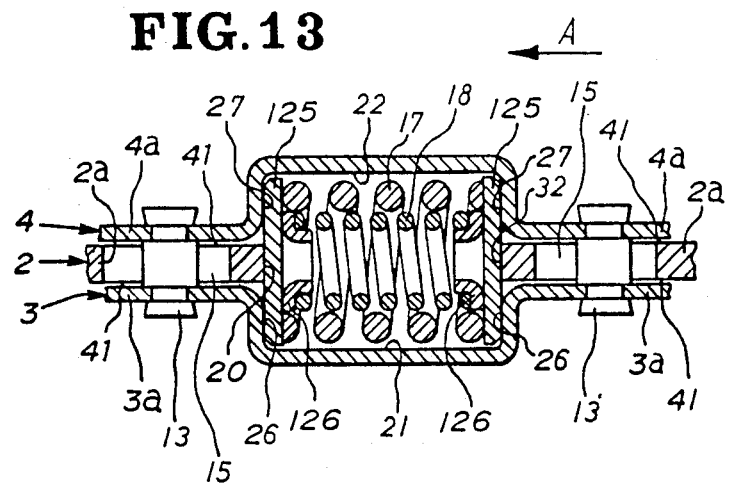
FIG. 13 is a sectional view taken along line XIII—XIII of FIG. 12.

The invention may be modified as shown in FIGS. 11–13, in which same members as those in FIGS. 1–5 and 7–9 bear the same reference numbers.

Referring to FIG. 11, radially spaced protrusions 130, which extend annularly as shown in FIG. 12, are formed at both side surfaces of a portion radially inside openings 20 in a hub flange 2. Annular members 132 are fixed by screws 131 to inner surfaces of radially inner portions of cases 3 and 4, respectively. The members 132 are provided with radially spaced annular protrusions 133, which engage with the protrusions 130 with narrow spaces therebetween. Each pair of the screws 131 are screwed into a female thread of a tubular collar 134, which enters a circumferentially long aperture 135 in the flange 2. The protrusions are not formed at portions around the apertures 135 in the members 132.

Referring to FIG. 13, when the cases 3 and 4 move in a rotation direction A, a spring seat 125 at the right in FIG. 13 also moves in the direction A, so that a oil is compressed between a pair of the seats 125. The compressed oil is discharged to the backs of the spring seats 125 through spaces 145 in FIG. 11 between the spring seats 125 (FIG. 13) and inner surfaces of radially outer portion of hollows 21 and 22. The compression and the discharge of the oil causes a resistance force to be transmitted to the cases 3 and 4 and the flange 2 through the seats 125. A resistance force caused by viscosity of the oil in the spaces 41, in other words, caused by shearing the oil in the spaces 41, is applied to portions 3a, 4a and 2a of the cases 3 and 4 and the flange 2 which face each other.

Further, the protrusions 132 also torsionally turn together with the cases 3 and 4 with respect to the flange 2, so that a resistance force is caused by viscocity of the oil between the protrusions 130 of the flange 2 and the protrusions 133 of the cases 3 and 4, in other words, a resistance force is cause by shearing the oil therebetween, and is applied to the flange 2 as well as the members 132 and the cases 3 and 4. This resistance force is large, because the protrusions 130 and 133 has large surface area.

Figure 14:
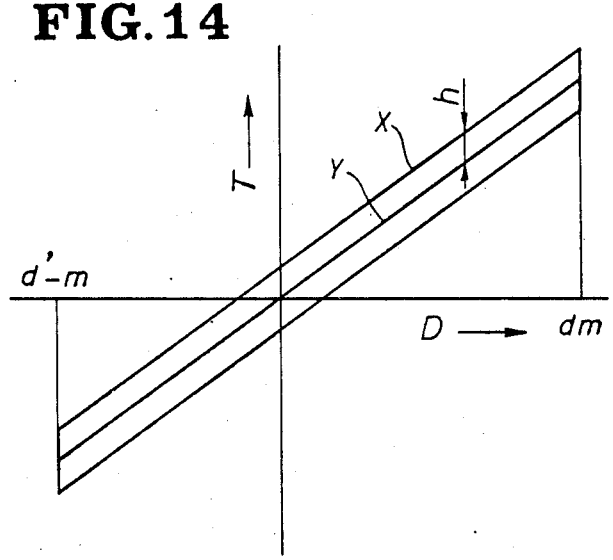
FIG. 14 is a graph of transmitted torque characteristics.

As detailed hereinbefore, the resistance force is caused in the oil by the torsion of the cases 3 and 4, and a torque corresponding to the resistance force is transmitted from the cases 3 and 4 to the flange 2 through the oil (not through the springs 17 and 18), so that, as shown in FIG. 14, a characteristic X including a hysteresis h is acquired.

Figure 15:
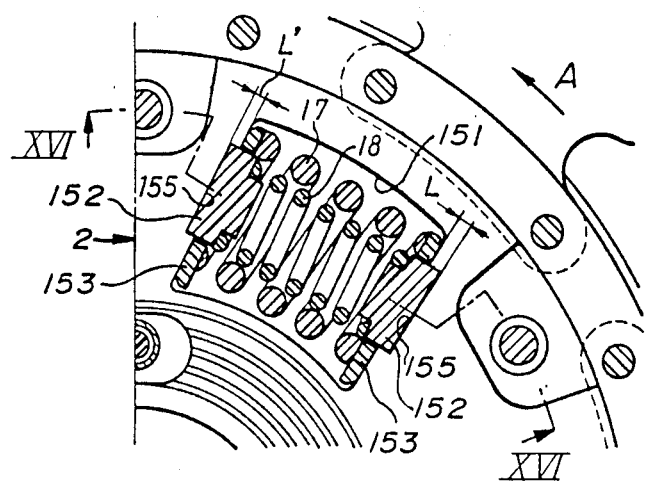
FIG. 15 is an axially viewed sectional partial view of a clutch disc of still another embodiment of the invention.
Figure 16:
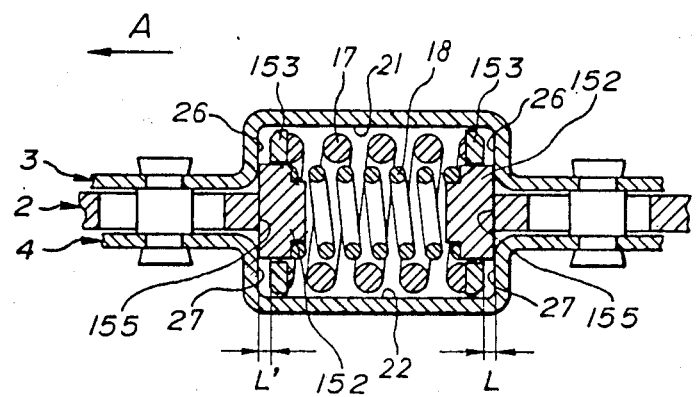
FIG. 16 is a sectional partial view taken along line XVI—XVI of FIG. 15.

Structures in FIGS. 15 and 16 may be employed in some or all of openings 151 in the hub flange 2.

Referring to FIG. 15, a pair of spring seats 152 of small diameter are arranged at both ends of each spring 18 of small diameter. Both ends of each spring 17 of large diameter are supported by annular spring seats 153 which are slidably fitted around the seats 152. The spring seats 152 protrude distance L or L' rearwardly beyond the spring seats 153. Each side edge 155 of the openings 151 is hollowed at its middle portion, so that both of the seats 152 and 153 may be supported on the edge 155 when a torsion angle is zero as illustrated. referring to FIG. 16, when the torsion angle is zero, the inner end surfaces 26 and 27 of the hollows 21 and 22 in the cases 3 and 4 are in contact with the spring seats 152 and are apart from the spring seats 153 with spaces L and L' corresponding to said distances L and L' therebetween.

In the structures in FIGS. 15 and 16, when the torsion angle of the cases 3 and 4 is small, only the spring 18 is compressed. When the cases 3 and 4 torsionally turn a degree corresponding to the space L or L', the inner end surface 26 and 27 contact the spring set 152, and, thereafter, the spring 17 is compressed. Consequently, the springs 17 and 18 operate at two steps. The moving spring seat 152 and 153 compress and discharge the oil from each spring chamber, which causes a hysteresis.

In the embodiment in FIG. 11, a single spring may be employed instead of each pair of the springs 17 and 18.

Since the protrusions 130 and 133 have the large surface area, a large hysteresis can be acquired on the protrusions 130 and 133, so that the hysteresis is not essentially required to be caused by the structures including the springs and the seats. Thus, the spring seats 125 (or 152 in FIG. 15) may be eliminated, and the spaces 41 and 145 may be widened.

The protrusions 130 may be formed independently of the flange 2 and fixed to the flange 2. The protrusions 130 and 133 may be formed only on one side surface of the flange 2 and one of the cases 3 and 4 faced thereto.

Although the invention has been described in its preferred form with a certain degree of particularity, it is understood that the present disclosure of the preferred form may be changed in the details of construction and the combination, and arrangement of parts may be resorted to without departing from the spirit and scope of the invention as hereinafter claimed.

What is claimed:
1. A damper disc, comprising:
   a spline hub;
   a radial flange formed at the hub;
   a pair of cases rotatably mounted on the spline hub and innerconnected at the radially outer end thereof, said pair of cases being disposed, respectively, on opposite sides of the flange;
   circumferentially spaced plural compressible coil spring assemblies operably connecting the cases and the flange together, at least one of said coil spring assemblies including axially aligned and concentric first and second coil springs, said first coil spring disposed within said second coil spring, such that one of said springs begins to compress before the other;
   at least one side face of said flange, radially inward of said spring assemblies, having a plurality of radially spaced annular projecting protrusions with radially spaced annular recesses therebetween;
   at least one of said pair of cases having a plurality of radially spaced annular protrusions projecting inwardly into said annular recesses between said spaced annular protrusions on said flange and forming narrow oil receiving recesses between said flange and said case protrusions;

a sealed oil chamber formed around each of said spring assemblies and said flange and case projecting protrusions and said cases and having only sealed narrow spaces connecting said spring chambers together and said narrow oil receiving recesses together; and spring seats disposed at both ends of each spring assembly, said chamber and each narrow oil receiving recesses being filled with oil, so that said oil provides a resistance force to the moving spring seats and to the relative movement of said radially spaced annular projecting flange protrusions relative to said radially spaced annular projecting case protrusions.

2. A damper disc, as recited in claim 1, in which the side faces of said flange radially inward of said spring assemblies each have a plurality of radially spaced annular projecting protrusions with radially spaced annular recesses therebetween and each of said pair of cases has a plurality of radially spaced annular protrusions projecting inwardly into the annular recesses between the spaced annular protrusions on the flange face facing thereto and form narrow oil receiving recesses between said flange and said case protrusions.

3. A damper disc, as recited in claim 2, in which said oil chambers are only slightly larger in cross-section than said spring seats to enable said spring seats to function as hydraulic pistons, wherein at least one of said spring seats corresponding with said first and second springs has two portions movable independently from each other, a first portion supporting said first spring and a second portion supporting said second spring, said first portion engaging a projection on said flange to cause said first spring to compress before said second spring which is not engaged with said projection.

4. A damper disc, as recited in claim 1, in which said oil chambers are only slightly larger in cross-section than said spring seats to enable said spring seats to function as hydraulic pistons, wherein at least one of said spring seats corresponding with said first and second springs has two portions movable independently from each other, a first portion supporting said first spring and a second portion supporting said second spring, said first portion engaging a projection on said flange to cause said first spring to compress before said second spring which is not engaged with said projection.

* * * * *

UNITED STATES PATENT AND TRADEMARK OFFICE
CERTIFICATE OF CORRECTION

PATENT NO. : 4,674,991

DATED : June 23, 1987

INVENTOR(S) : HIROMI TOJIMA ET AL

It is certified that error appears in the above-identified patent and that said Letters Patent is hereby corrected as shown below:

On the cover page, Item [30], delete in its entirety.

Signed and Sealed this

First Day of December, 1987

Attest:

DONALD J. QUIGG

Attesting Officer          Commissioner of Patents and Trademarks